United States Patent [19]
Mitsumori et al.

[11] Patent Number: 5,783,790
[45] Date of Patent: Jul. 21, 1998

[54] WET TREATMENT METHOD

[75] Inventors: Kenichi Mitsumori; Yasuhiko Kasama, both of Sendai; Koji Yamanaka; Takashi Imaoka, both of Toda; Tadahiro Ohmi, 1-17-301, Komegafukuro 2-chome, Aoba-ku, Sendai-shi, Miyagi-ken, all of Japan

[73] Assignees: Organo Corporation; Tadahiro Ohmi, both of Japan

[21] Appl. No.: 759,013

[22] Filed: Dec. 2, 1996

[30] Foreign Application Priority Data

Nov. 30, 1995 [JP] Japan .................. 7-312366

[51] Int. Cl.$^6$ .................. C07C 1/00; C02F 1/461; B08B 6/00
[52] U.S. Cl. .................. 204/157.15; 205/742; 205/748; 205/755; 205/756; 134/1; 134/1.3
[58] Field of Search .................. 204/157.15, 157.42; 134/1, 1.3; 205/742, 748, 770, 755, 756

[56] References Cited

U.S. PATENT DOCUMENTS 2,961,354  11/1960  Cleveland .................. 134/1
5,635,053  6/1997  Aoki et al. .................. 205/746

FOREIGN PATENT DOCUMENTS 63-93140   4/1988   Japan.
5-163101   6/1993   Japan.
7-311938   11/1995  Japan.

Primary Examiner—Kathryn L. Gorgos
Assistant Examiner—Eana Wong
Attorney, Agent, or Firm—Fish & Richardson P.C.

[57] ABSTRACT

A surfactant is added to anodic or cathodic water obtained by electrolyzing deionized water or high-purity water. Then, an object of treatment is treated with the anodic or cathodic water containing the surfactant. The object of treatment may be treated, in this way, while irradiating it with an ultrasonic wave having a frequency between 30 kHz and 3 MHz. Furthermore, the anodic or cathodic water is continuously jetted or dropped onto the object of treatment from a nozzle, while irradiating an ultrasonic wave at least at a part in the feed pipe of the anodic or cathodic water.

17 Claims, 3 Drawing Sheets

WET TREATMENT METHOD

BACKGROUND OF THE INVENTION

1. Field of the Invention

This invention relates to a wet treatment method for processing an object such as the glass substrate of a liquid crystal display or some other electronic part that is required to have a very clean surface.

2. Prior Art

Firstly, a known wet treatment method for processing an object such as an electronic part required to have a very clean surface will be described by way of a silicon wafer to be used for manufacturing an LSI.

In the LSI manufacturing process, after forming an insulation film typically of $SiO_2$ on a silicon wafer and etching the film as a given pattern until the underlying silicon is exposed through the openings formed by etching, the silicon wafer is subjected to a wet treatment and then a p⁻type or n⁻type element is introduced into it depending on the application of the manufactured LSI. The foregoing steps are repeated and then metal wires typically of Al are formed thereon to produce an desired device.

If impurities such as fine particles of foreign matter including metals, organic substances and naturally formed oxides adhere to the exposed surface of the silicon in the step of introducing a p⁻type or n⁻type element and/or that of forming metal wires, the produced device is found to be defective due to a defective metal-silicon wiring arrangement, an increased contact resistance or some other inferior characteristics of the device.

Therefore, a surface wet treatment is of vital importance in the LSI manufacturing process in order to produce a high quality device by removing as much as possible impurities adhering to the wafer surface.

Conventionally, a wet treatment is typically conducted on semiconductor wafers in a manner as described below. A various combinations of a mixed solution of sulfuric acid and aqueous hydrogen peroxide, that of hydrochloric acid and aqueous hydrogen peroxide, that of ammonia and aqueous hydrogen peroxide, a hydrofluoric acid solution, an ammonium fluoride solution and high-purity water are used in the process of removing organic substances, fine particles, metals and naturally formed oxides adhering to the semiconductor surface without damaging the planeness of the surface in atomic terms. The process typically comprises the following steps.

| | |
|---|---|
| (1) cleansing with sulfuric acid/aqueous hydrogen peroxide (sulfuric acid:aqueous hydrogen peroxide = 4:1 in volume ratio), 130° C. | 10 minutes |
| (2) cleansing with high-purity water | 10 minutes |
| (3) cleansing with hydrofluoric acid (hydrofluoric acid 0.5%) | 1 minute |
| (4) cleansing with high-purity water | 10 minutes |
| (5) cleansing with ammonia water/aqueous hydrogen peroxide/high-purity water (ammonia water:aqueous hydrogen peroxide:high-purity water = 0.05:1:5 in volume ratio), 80° C. | 10 minutes |
| (6) cleansing with high-purity water | 10 minutes |
| (7) cleansing with hydrofluoric acid (hydrofluoric acid 0.5%) | 1 minute |
| (8) cleansing with high-purity water | 10 minutes |
| (9) cleansing with hydrochloric acid/aqueous hydrogen peroxide (hydrochloric acid:aqueous hydrogen peroxide:high-purity water = 1:1:6 in volume ratio), 80° C. | 10 minutes |
| (10) cleansing with high-purity water | 10 minutes |
| (11) cleansing with hydrofluoric acid (hydrofluoric acid 0.5%) | 1 minute |
| (12) cleansing with high-purity water | 10 minutes |
| (13) spin drying or drying with IPA (isopropyl alcohol) vapor | |

The objectives of some of the above steps in a conventional wet treatment process are as follows. The cleansing with sulfuric acid/aqueous hydrogen peroxide in step (1) is intended mainly to remove organic substances adhering to the surface. The cleansing with ammonia/aqueous hydrogen peroxide in step (5) is mainly to remove fine particles adhering to the surface and the cleansing with hydrochloric acid/aqueous hydrogen peroxide in step (9) is intended mainly to remove metallic impurities adhering to the surface, whereas the cleansing with hydrofluoric acid in each of steps (2), (7) and (11) has the aim of removing the naturally formed oxide film found on the surface.

Another example of conventional wet treatment used for electronic parts required to have a very clean surface will be described below by way of a glass substrate to be used for manufacturing a liquid crystal display apparatus.

In the process of manufacturing a liquid crystal display apparatus, gate metal wires of Cr, a gate insulation film of silicon nitride, an i⁻type (intrinsic type) amorphous silicon (a-Si)layer, a n⁺type amorphous silicon layer and metal wires of Al/Cr are sequentially formed on the glass substrate. Thereafter, the layers of the metal wires of Al/Cr and the n⁺type amorphous silicon are etched to show a predetermined pattern having openings, through which the i⁻type amorphous silicon layer is exposed. Finally, an interlayer insulation layer typically made of silicon nitride is formed in repeated steps to produce a plurality of such films before the process of manufacturing the device is completed.

If impurities such as fine particles of foreign matter including metals, organic substances and naturally formed oxides are adhering to the interface of the gate metal wiring and the gate insulation film and that of the gate insulation film and the i⁻type amorphous silicon layer, the produced device may not operate satisfactorily due to defective metal-silicon wiring, an undesirably increased contact resistance and/or other inferior characteristics of the device.

Thus, the surface wet treatment that is conducted after the formation of thin films in the process of manufacturing a liquid crystal display apparatus is of vital importance to produce a high performance apparatus and hence, impurities adhering to the surface thereof have to be removed as thoroughly as possible.

Conventionally, a wet treatment is carried out on the glass substrate of a liquid crystal display apparatus in the following manner during the manufacturing process. An organic solvent, a solution of a water soluble surfactant and high-purity water are used in combination to remove mainly organic substances and fine particles adhering to the surface of the substrate in the steps as listed below.

(1) cleansing with high-purity water/immersion cleansing/5 minutes (2) cleansing with a surfactant/ultrasonic wave (40 kHz)/immersion cleansing/5 minutes (3) cleansing with high-purity water/ultrasonic wave (40 kHz)/immersion cleansing/5 minutes (4) cleansing with high-purity water/ultrasonic wave (950 kHz)/immersion cleansing/5 minutes (5) drying/IPA vapor drying Although high-purity water as used in the above steps generally refers to highly pure water (secondary deionized water) prepared by means of a deionized water producing apparatus comprising a primary deionization treatment system and a secondary deionization treatment system, it is not by any means defined in terms of treatment procedures and it is possible to use any water adapted to wet treatment (highly deionized water) for cleansing electronic parts such as glass substrates required to have a very clean surface.

A technique generally referred to as a batch cleansing method of collectively immersing a plurality of substrates into a wet treatment tank containing a chemical agent (or high-purity water) is commonly used for the purpose of bringing a wet treatment agent and/or high-purity water into contact with the surface of a semiconductor wafer substrate or that of the glass substrate of a liquid crystal display apparatus.

In the batch cleansing method, the chemical agent in the wet treatment tank is circulated and filtered in order to protect it against contamination during the wet treatment operation. A number of rinsing techniques have been proposed including the overflow rinse method of supplying high-purity water into the tank through the bottom thereof and causing the water to overflow from the tank top and the quick dump rinse method of storing high-purity water in the tank until all the substrates in the tank are immersed in the water and draining the tank through the bottom thereof in a single operation.

In addition to the batch cleansing method, a so-called single wafer wet treatment method of showering a chemical agent or high-purity water on the surface of a substrate or pouring a chemical agent or high-purity water on the center of a substrate revolving at an enhanced rate of revolution has found wide use.

While the objectives of the wet treatment steps are described above, each wet treatment solution can remove more often than not, contaminants other than the principal objects of cleansing. For example, a mixed solution of sulfuric acid/aqueous hydrogen peroxide in step (1) above is highly effective in removing metals adhering to the surface of a glass substrate in addition to the ability of removing organic matter on the surface. Thus, unlike the above described cleansing process, a single solution may be used to remove more than one contaminant.

The above described rinse operation using high-purity water that follows the process of removing contaminants adhering to the surface of a substrate by means of a chemical agent is intended to remove the residual chemical agent on the surface of the substrate and high-purity water typically prepared by means of a high-purity water producing apparatus is used for the rinse. This operation is important because the surface of the cleansed substrate has to be free of contaminants after it is cleansed by a chemical agent(s) in the wet treatment process. Rinse water to be used for removing the chemical agent(s) should be high-purity water obtained by removing fine particles, colloidal substances, organic matter, metals, anions and dissolved oxygen from ordinary water.

High-purity water to be used for the purpose of the above-mentioned purpose (rinsing) is typically prepared by means of a process as described below.

Firstly, primary deionized water is obtained by treating raw water by means of a primary deionization treatment system comprising a coagulation/sedimentation unit, a sand filtration unit, an activated carbon filtration unit, a reverse osmosis unit, a two-bed ion exchange system, a mixed bed type ion exchanges system, a micronic filter unit and so forth and subsequently the obtained primary deionized water is further treated in a secondary deionization treatment system located immediately upstream of points of use for carrying out a wet treatment operation on the object of treatment. With a high-purity water producing apparatus having unit processes as described above, primary deionized water is stored in a primary deionized water tank and then subjected to a secondary treatment sequentially using an ultraviolet-ray irradiation unit, a mixed-bed type ion exchange polisher and membrane separation unit such as an ultrafiltration unit or a reverse osmosis unit to remove residual fine particles, colloidal substances, organic matter metals, anions and dissolved oxygen from the primary deionized water as thoroughly as possible to produce high-purity water (secondary deionized water) adapted to the operation of wet treatment to be conducted on the object of treatment.

Generally speaking, high-purity water obtained by filtering primary deionized water by means of a secondary deionization treatment system is fed to points of use by branching the circulation line, while the remaining high-purity water is fed back to the primary deionized water tank by way of a return piping of the circulation line. The water fed back to the primary deionized water tank by way of the return piping is normally 10 to 30% of the water coming from the secondary deionization treatment system (membrane separation unit). With the state of the art in this field of technology, high-purity water produced by a typical high-purity water producing apparatus for manufacturing LSIs according to the submicron design rule typically has a quality as shown in Table 1 below. It is recognized that the surface of an LSI rinsed with such high-purity water is free from contaminants of any originating from the high-purity water.

TABLE 1

| electric resistivity | 18.0 | MΩ · CM or more |
|---|---|---|
| total organic carbon | 10 | μg C/L or less |
| number of fine particles (diameter: 0.07 μm or less) | 10 | PCS./ml or less |
| number of living bacteria | 10 | CFU/L or less |
| dissolved oxygen | 10 | μg O/L or less |
| silica | 1 | μg $SiO_2$/L or less |
| sodium | 0.01 | μg Na/L or less |
| iron | 0.01 | μg Fe/L or less |
| copper | 0.01 | μg Cu/L or less |
| chloride ion | 0.01 | μg Cl/L or less |
| hydrogen ion concentration (pH) | 7 | |
| oxidation/reduction potential | 450 | mV (relative to NHE) |

L: liter

However, the above wet treatment technology is accompanied by the following shortcomings.

In the field of manufacturing electronic parts, which is highly competitive particularly in terms of price, the manufacture of high performance and low cost products is the key to meeting fierce competition. Particularly, the wet treatment process plays an important role in the manufacture of LSIs and liquid crystal displays and is under high pressure for cost reduction, although the final product is required to show an improved performance. In view of these technological and economic requirements, the conventional technology for wet treatment has the following drawbacks.

Firstly, most of the conventional solutions used for cleansing the surface of a silicon substrate were formulated in the 1970s or earlier with the composition and concentrations of these solutions remaining much the same. For instance, since the mixed cleansing solution of hydrochloric acid/aqueous hydrogen peroxide for removing metallic impurities adhering to the surface of a silicon substrate is a mixture of hydrogen acid and an oxidant, chemical species other than hydrochloric acid and hydrogen peroxide may have been produced in the solution by chemical reaction, although such chemical species have not been identified nor their cleansing effects defined. This means that there is no way for scientifically optimizing the composition of the mixture and the contents of the ingredients. The current practice is that the precedents have been relied on and the solution containing inordinately/high concentrations of hydrochloric acid and hydrogen peroxide are used for cleansing a substrate, thereby insuring better cleaning effects. As a result, the chemicals to be used for cleansing the substrate are disproportionately costly and high-purity water has to be consumed at an enormous rate in order to rinse the substrate that has been cleaned with unnecessarily highly concentrated chemicals to consequently raise the cost of supplying high-purity water. The use of highly concentrated chemicals entails an enhanced rate of consumption of rinse water, which is by turn accompanied by an increase in the cost of treating waste water.

On the other hand, a liquid crystal device is not highly integrated when compared with an LSI, and hence has to meet less rigorous requirements for the control of the surface against impurities and the surface planeness than an LSI. Thus, the process of cleansing the surface of a glass substrate with the prior art is less complicated and the number and the volume of the chemicals used for the process are far smaller than their counterparts for the process However, in recent years, it has been found that the manufacture of high-performance liquid crystal displays requires the operation of removing impurities from the surface and providing a plane surface to be held under control as rigorously as the manufacture of LSIs, while reducing the manufacturing cost and disposing waste water without adversely affecting the environment.

Japanese Patent Application Laid-Open No. Hei 6-260480 discloses a technique for improving the effect of cleansing the surface of a substrate, using a reduced number and volume of chemicals. According to the disclosed invention, the object of treatment is cleansed, etched and/or processed for post-treatment, while being constantly supplied with H+ or OH– ionized water obtained by electrolysis of water. However, this technique does not meet the level of surface cleanness required for manufacturing liquid crystal displays of the next generation.

SUMMARY OF THE INVENTION

In view of the above described circumstances, it is therefore the object of the present invention to provide a wet treatment method that can improve the level of surface cleanness by using a minimal amount of chemicals and a minimal number of steps in the process of cleansing an object of treatment such as the glass substrate of a liquid crystal display or some other electronic part that is required to have an extremely clean surface.

According to the invention, the above object is achieved by providing a wet treatment method characterized in that a surfactant is added to anodic or cathodic water obtained by electrolyzing deionized water or high-purity water and treating an object of treatment with the anodic or cathodic water containing the surfactant. Preferably, the object of treatment is treated, while irradiating it with an ultrasonic wave having a frequency between 30 kHz and 3 MHz.

Preferably, the surfactant is an anionic, cationic or nonionic surfactant and added to anodic or cathodic water at a concentration between 1 and 500 ppm, more preferably between 10 and 300 ppm.

The object of treatment may be immersed in the anodic or cathodic water stored in or flowing through a container, while irradiating it with an ultrasonic wave. Alternatively, the anodic or cathodic water may be continuously ejected or dropped onto the object of treatment from a nozzle, while irradiating at least at one part of the feed pipe of the anodic or cathodic water located upstream of the nozzle with an ultrasonic wave.

Preferably, the object of treatment is treated with aqueous ozone after being treated with the anodic or cathodic water containing the surfactant.

Preferably, the aqueous ozone is deionized water, high-purity water or cathodic or anodic water containing ozone at a concentration between 0.5 and 15 ppm, more preferably between 2 and 9 ppm.

The object of treatment may be treated with electrolytically ionized water containing the surfactant prepared by adding the surfactant to the anodic or cathodic water obtained by electrolyzing deionized water or high-purity water and subsequently treated in the treatment zone with anodic water containing ozone prepared by suspending the addition of the surfactant and electrolyzing deionized water or high-purity water under a condition apt to generate ozone.

The deionized water or high-purity water to be electrolyzed may be prepared by means of a deionized water producing apparatus or a high-purity water producing apparatus provided at least with an ion exchange system, a membrane separation treatment system or an evaporation system, to which an appropriate electrolyte may or may not be added.

Preferably, the apparatus for electrolyzing deionized water or high-purity water comprises three chambers of an anode chamber provided with an anode, a cathode chamber provided with a cathode and an intermediary chamber formed between the anode chamber and the cathode chamber by arranging a pair of diaphragms so that raw water is fed into each of the three chambers and treated water is fed out from each of the three chambers. Preferably, the diaphragms are ion exchange membranes. Preferably, the intermediary chamber is filled with a solid electrolyte.

The method of this invention is eminently suitable for the treatment of a substrate of a liquid crystal display.

A wet treatment method according to the first aspect of the invention has a remarkable effect of removing impurities such as fine particles, metals and organic matter and can greatly economize the consumption of chemicals and deionized water when compared with a conventional method. It is highly effective on substrates that are poorly wettable to consequently reduce the work load of waste water treatment.

The effect of removing fine particles and metals can be improved by means of ultrasonic wave irradiation.

A large number of objects of treatment can be treated at the same time to improve the efficiency if they are immersed in electrolytically ionized water, even when they are poorly wettable.

The effect of treatment can be further improved by the irradiation with ultrasonics wave and the risk of recontamination is eliminated by injecting electrolytically ionized water on the objects of treatment. If ozone is added to electrolytically ionized water, the surface can be cleansed very effectively and, if a film is formed on it thereafter, the film is highly adherent to the surface to make the latter adapted to the manufacture of devices of higher circuitry density.

According to another aspect of the invention, ozone can be produced without using an ozone generator and added to electrolytically ionized water to improve the effect of the invention.

If deionized water or high-purity water to be electrolyzed for the purpose of the invention is added with an electrolyte, the effect of the invention is further improved.

The electric resistance between the anode and the cathode can be reduced in an ingenious way according to the invention to produce electrolytically ionized water with a low voltage.

DETAILED DESCRIPTION OF THE PREFERRED EMBODIMENT

Figure 1:
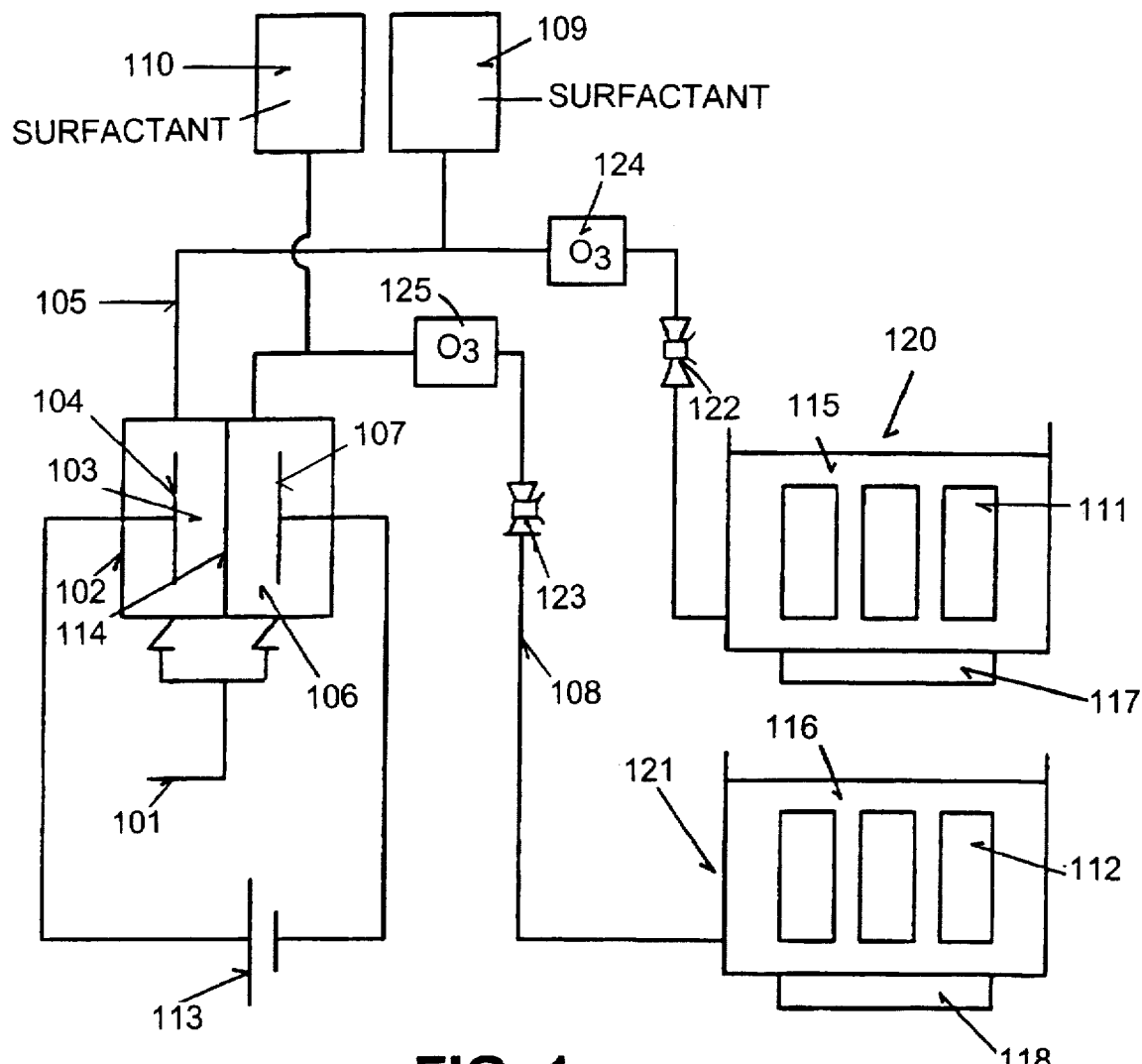
FIG. 1 is a schematic block diagram of a wet treatment system that is suitable for use with a wet treatment method according to the invention.

Now, the present invention will be described further by referring to the accompanying drawings. FIG. 1 is a schematic block diagram of a wet treatment system that is suitable for used with a wet treatment method according to the invention and adapted to carry out the operation of wet treatment by immersing the object of treatment into a solution.

The system of FIG. 1 comprises an electrolysis unit 102 for electrolyzing water, a feed-in piping system 101 for feeding water to the electrolysis unit 102, feed-out piping systems 105 and 108 for drawing out respectively anodic water and cathodic water produced by the electrolysis unit 102, surfactant injection units 109 and 110 for adding a surfactant respectively to the anodic water and the cathodic water as required, ultrasonic wave oscillators 117 and 118 adapted to irradiate the anodic water 115 and the cathodic water 118 with an ultrasonic wave independently, wet treatment units 120 and 121 for wet-treating respective objects of treatment with the treatment solutions obtained respectively by irradiating the anodic water and the cathodic with an ultrasonic wave. Note that the electrolysis unit 102 is divided into an anode chamber 103 and a cathode chamber 106 by means of a diaphragm 114 and provided in the inside respectively with an anode 104 and a cathode 107. The paired electrodes 104 and 107 are connected to a DC power source 113 for feeding them with power.

The feed-out piping systems 105 and 108 are provided with respective ozone generators 124 and 125 in order to add ozone to electrolytically ionized water (anodic water and cathodic water).

The system is also provided with an instrumentation section for measuring the intensity of ultrasonic wave irradiation and a control system for controlling the ion species, the ion concentration and the oxidation/reduction potential of the treatment solutions of the system by regulating the intensity of the DC current and that of ultrasonic wave irradiation.

The operation of cleansing a substrate by means of the treatment system of FIG. 1 will be described below. Firstly, deionized water is fed into the electrolysis unit by way of the feed-in piping system 101. Note that the valves 122 and 123 of the unit are turned to the drain side. Then, DC power is supplied to the anode and the cathode to start the operation of electrolyzing deionized water and a surfactant is added to the electrolytically ionized water at a given rate from each of the surfactant injection units. The quality of the electrolytically ionized water (in terms of pH, oxidation/reduction potential, etc.) is constantly monitored by a water quality measuring unit (not shown) and the valves 122 and 123 are switched to feed the surfactant containing electrolytically ionized water to the wet treatment units 120 and 121, where the objects of treatment 111 and 112 that may be substrates are cleansed with electrolytically ionized water that is constantly overflowing or flowing in the form of a parallel down flow.

Under this condition, a given voltage is applied to the ultrasonic wave oscillators 117 and 118 to irradiate the electrolytically ionized water and the substrates with an ultrasonic wave. The effect of cleansing the object of treatment, which is typically a glass substrate, is remarkably improved by treating the substrate, using electrolytically ionized water containing an surfactant as an additive and irradiating the water with an ultrasonic wave particularly in terms of removing fine particles therefrom.

This may be explained by the fact that the fine particles adhering to the substrate are loosened and eventually separated from the substrate by the vibration caused by the ultrasonic wave, when the surfactant covers the fine particles to adsorb them, while the fine particles and the substrate come to bear a same zeta potential to prevent the fine particles from adhering back to the substrate and/or coagulating. For the purpose of the invention, the frequency of the ultrasonic wave applied to the object of treatment is preferably between 30 kHz and 3 MHz and more preferably between 1 MHz and 3 MHz for removing fine particles with a diameter less than 1 µm. If the fine particles have a diameter greater than 1 µm, an ultrasonic wave with a frequency between 30 kHz and 1 MHz is preferably applied. The use of an ultrasonic wave with a frequency between 1 MHz and 3 MHz is preferable for removing metals which adhere to the substrate is fine particles. The use of an ultrasonic wave with a frequency between 30 kHz and 1 MHz is preferable for removing the resist and/or the organic substances adhering to the surface of the solid object of treatment. Thus, it may be understood that the cleansing operation is conducted while gradually shifting the frequency typically from 30 kHz to 3 MHz (or vice versa). The surfactant to be used for the purpose of the invention may be selected from anionic, cationic and nonionic surfactants depending on the material of the object of treatment, the type of fine particles to be removed and other considerations. It may be added at a concentration of preferably between 1 and 500 ppm, more preferably between 10 and 300 ppm. A concentration under 1 ppm does not provide a satisfactory effect of removing fine particles, whereas if it is added at a concentration exceeding 500 ppm, the surfactant adhering to the substrate can reduce the adhering force of the films formed on the substrate in subsequent steps depending on the conditions for forming the films. However, it should be noted that the surfactant adsorbed by the substrate can be completely removed in the treatment step using aqueous ozone as will be described hereinafter.

Figure 2:
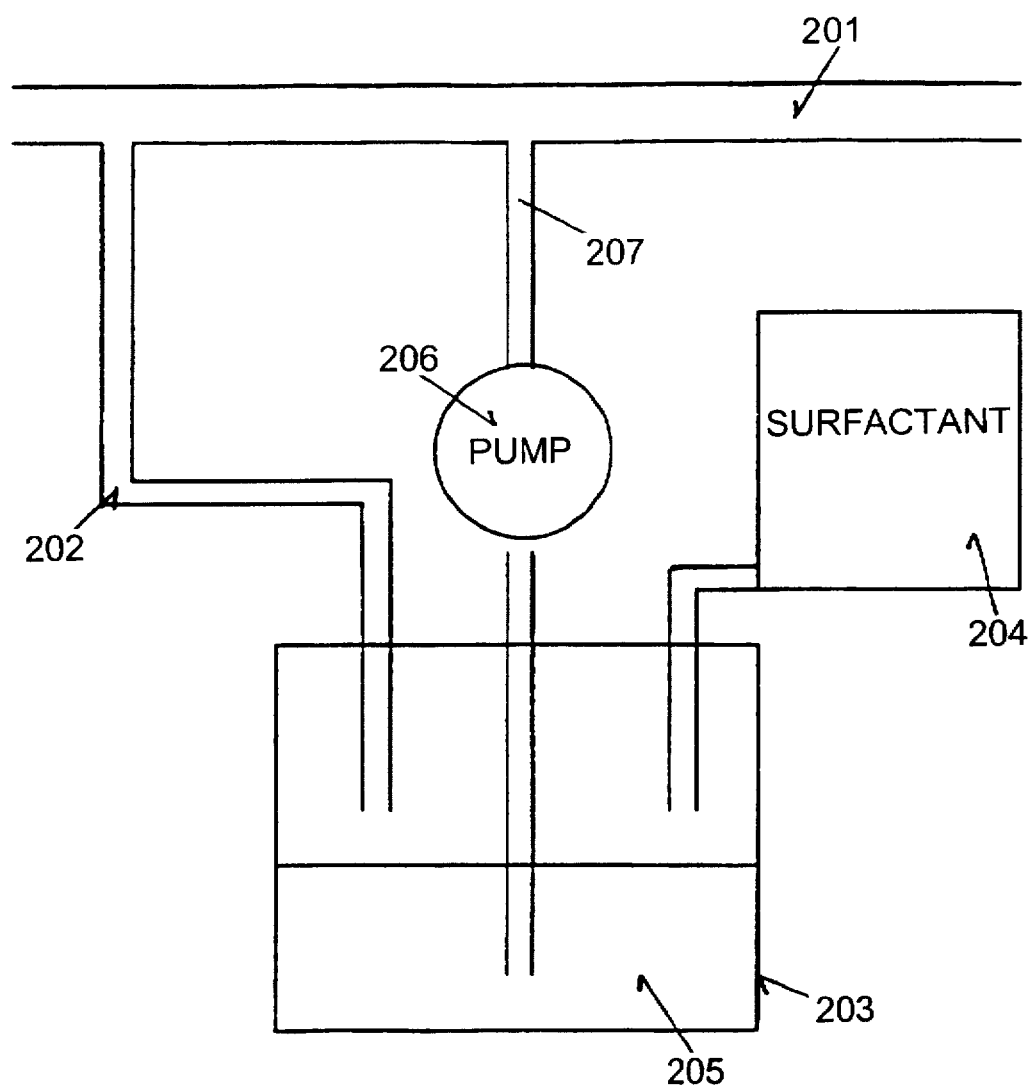
FIG. 2 is a schematic block diagram of a surfactant injection unit.

Each of the surfactant injection units may be directly connected to the feed-out piping system for anodic water or cathodic water, or may be arranged in a manner as illustrated in FIG. 2, where a dilution tank 203 is provided and electrolytically ionized water is fed into the dilution tank 203 by way of a dilution pipe 202, while a surfactant is fed into it from the related surfactant injection unit 204, to dilute the latter to a desired concentration. The diluted solution 205 is then pumped out into the feed-out piping system 201 via a surfactant injection pipe 207 by means of a pump 206.

Since the rate of adding the surfactant is very low, it has to be dissolved into a solvent to realize a low concentration if an accurate concentration of the added solution has to be achieved, inevitably involving the use of a large tank. In contrast, with the arrangement of FIG. 2, where the surfactant is diluted in the dilution tank, the surfactant may be stored in the storage tank at a high concentration so that it can be added stably and accurately regardless of the duration of the operation.

For the purpose of the invention, the irradiation of ultrasonic wave is not necessarily required in the treatment zone. It has been found that a wet treatment method according to the invention can provide a satisfactory effect of removing impurities without using an ultrasonic wave when compared with a case of using only electrolytically ionized water or deionized water containing a surfactant depending on the required level of cleanness.

More specifically, the effect of removing impurities by electrolytically ionized water containing a surfactant according to the invention is far above the level that can be expected from the rate of removal achievable by electrolytically ionized water alone or by deionized water containing the same surfactant, although the cleansing method of the present invention is very simple. Additionally, it has been found that the method of the present invention can evenly remove fine particles with regardless of their diameters.

Now, the process of removing the residual surfactant adhering to the surface of the substrate after the above cleansing process will be described. While the residual surfactant does not generally give rise to any problem because it is of a very small amount, it can become troublesome in a production line for manufacturing reversely staggered type thin film transistors arranged on a glass substrate, where a gate electrode, a silicon nitride gate insulation film, an i⁻type Si layer, an n⁺type a-Si layer and an electrode section are formed, and devices are separated and cleansed and an Al wiring pattern is formed. While the Al wiring pattern is formed on the gate insulation film in the above process, the adhering force of Al can be reduced to separate the Al wires from the underlaying film and the Al wires can be displaced in a subsequent patterning operation if the surfactant remains there, even if in a tiny amount. The residual surfactant cannot be removed if cleansed with ordinary high-purity water or electrolytically ionized water alone.

If such is the case, the residual surfactant remaining on the substrate surface after the cleansing operation using electrolytically ionized water containing a surfactant can be completely removed by treating the surface with water containing an oxidant such as ozone. More specifically, after completing the cleansing operation using electrolytically ionized water containing a surfactant, the operation of the surfactant injection unit is suspended and that of the ozone generators 124 and 125 are started to produce ozone in the electrolytically ionized water. The electrolytically ionized water containing ozone is fed to the treatment zone to remove the surfactant adhering to the surface of the substrate. Ozone generator UOW-1A available from Pelmec Electric is suitable for the purpose of the invention. The ozone concentration is preferably between 0.5 and 15 ppm, more preferably between 2 and 9 ppm, for the purpose of the invention. The use of ozone with the above defined concentration is highly effective for removing the surfactant.

Ozone may be dissolved into electrolytically ionized water by means of the electolyzis unit 102 without using ozone generators. If such is the case, electrolytically ionized water (anode water) containing ozone can be produced by applying a voltage good for generating ozone to the electrolysis unit 102 after completing the cleansing operation using electrolytically ionized water containing the surfactant and suspending the operation of the surfactant injection unit in order to remove the surfactant on the substrate surface as effectively as using the ozone generators. Ozone may be replaced by some other oxidant to remove the surfactant for the purpose of the invention. For example, the surfactant on the substrate surface can be removed by means of hypochlorite ions obtained by adding HCl to the deionized water introduced into the anodic chamber, and electrolyzing it under predetermined conditions.

Now, another method of producing electrolytically ionized water for the purpose of the invention will be described by referring to FIG. 3. The electrolysis unit 301 in FIG. 3 comprises an anodic chamber 302 provided with an anode 305, a cathodic chamber 304 provided with a cathode 306 and an intermediary chamber 303 arranged between the anodic chamber 302 and the cathodic chamber 304 and defined by a pair of diaphragms 307. The chambers 302, 303 and 304 of the electrolysis unit 301 are provided with a feed-in piping system 309 (310, 11, 312) for feeding feed water and respective feed-out piping systems 315, 316 and 317 for the chambers 302, 303 and 304.

Note that the diaphragms 307 for separating the intermediary chamber 303 from the anodic chamber 302 and the cathodic chamber 304 are ion exchange membranes and the intermediary chamber 303 is filled with a solid electrolyte.

Firstly, high-purity water is introduced into the anodic chamber 302, the intermediary chamber 303 filled with a solid electrolyte and the cathodic chamber 304 by way of the respective feed-in piping systems 310, 311 and 312 to make the water circulate. Under this condition, HCl and NH4OH are continuously poured into the feed-in piping systems 310 and 312 from the electrolyte adding units 313 and 314 respectively in a controlled manner in such a way that, for example, pH2 and pH8 are observed respectively in the anodic chamber and the cathodic chamber. Then, the electrodes 305 and 306 are energized by a DC current to continuously give rise to electrolysis and produce electrolyzed anodic water (pH2) and electrolyzed cathodic water (pH8).

Due to the three chamber arrangement of placing an intermediary chamber between the anodic and cathodic chambers and separating it from the latter by means of a pair of diaphragms, electrolytically ionized water containing few impurities and different properties can be obtained to cleanse the object of treatment to a very high level. Additionally, since the diaphragms separating the intermediary chamber from the anodic and cathodic chambers are ion exchange membranes having electric conductivity, the electric resistance between the anode and the cathode can be remarkably reduced and hence electrolytically ionized water can be obtained with a low voltage.

Still additionally, since the intermediary chamber is filled with an electroconductive solid electrolyte, the electric resistance between the anode and the cathode can be further reduced and hence electrolytically ionized water can be obtained with a very low voltage.

Still additionally, since the water introduced into the electrolysis units is deionized water or high-purity water obtained by means of a deionized water or high-purity water producing apparatus provided at least with an ion exchange system, a membrane separation treatment system or an evaporation system or electrolytically ionized water obtained by adding a predetermined electrolyte to said deionized water or high-purity water, anodic water or cathodic water containing very few impurities can be made available for cleansing the object of treatment very effectively particularly when it is irradiated with an ultrasonic wave.

Besides the above described techniques of overflow and parallel down flow, the batch cleansing method, the showering method and the sheet cleansing method are also suitable for use in the treatment zone for the purpose of the invention. A technique of continuously injecting or dropping cleansing water onto the object of treatment from a nozzle is particularly advantageous because the object of treatment can always be cleansed with fresh cleansing water and kept free from contamination so that it can be held at an enhanced level of cleanness.

For the purpose of the invention, the object of treatment may be selected from various materials and parts used for manufacturing electronic parts. Examples include substrates for liquid crystal displays (glass substrates and substrates with electroconductive thin films, insulation thin films, semiconductor thin films), memory devices, CPUs, sensor devices, metal chambers of various film forming apparatus, valves, pipes, quartz pipe reactors, cleansing tanks, film forming apparatus, substrate carriers and other manufacturing devices.

[EXAMPLES]

Now, the present invention will be described further by way of examples. Note, however, that the examples described hereinafter do not by any means limit the scope of the invention. (Example 1)

Figure 3:
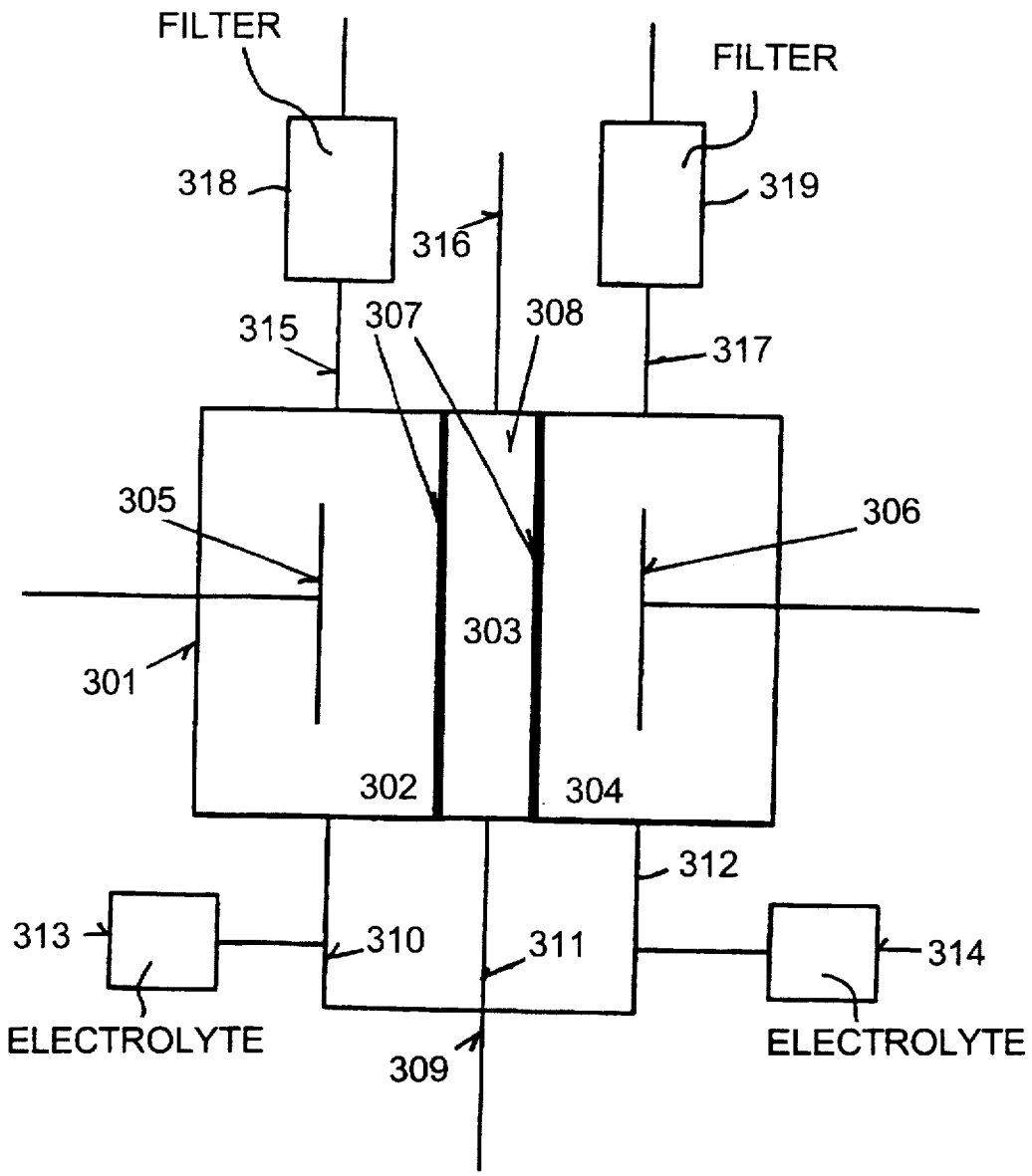
FIG. 3 is a schematic block diagram of another wet treatment system that is suitable for use with a wet treatment method according to the invention.

The electrolysis unit of FIG. 3 was used along with the wet treatment system of FIG. 1 to carry out wet treatment a glass substrates to be used for liquid crystal display apparatus in different modes and under different conditions and the metal removing effect was observed.

Glass substrates carrying an i‾type a-Si film were used as objects of treatment. For the purpose of clearly differentiating the modes, the objects of treatment had been contaminated by means of the process of Table 2.

For the purpose of comparison, a conventional silicon wafer cleansing process was also used. Table 3 shows the results in summarized form.

[Table 2]

1) i‾type a-Si coated glass substrate
2) immersion in a 0.5% hydrofluoric acid solution (added with 1 ppm of $CuCl_2$) for 10 minutes
3) over-Flow rinsing with high-purity water for 5 minutes
4) spin drying

TABLE 3

| wet treatment method | surface Cu concentration atoms/cm2 | | solubles in solution (disregarding removed Cu) | remarks |
|---|---|---|---|---|
| | before | after | | |
| 1. high-purity water/ overflow 10 min. room temp. | $1.5 \times 10^{12}$ | $1.3 \times 10^{12}$ | — | — compar. example |
| 2. hydrochloric acid, hydrogen peroxide/batch 10 min. 65° C. | $1.6 \times 10^{12}$ | $2.0 \times 10^{10}$ | hydrochloric acid 4.4% hydrogen peroxide 3.8% | compar. example cracks on surface |
| 3. sulfuric acid, hydrogen peroxide/batch 10 min. 130° C. | $1.4 \times 10^{12}$ | $<1.0 \times 10^{10}$ | surfuric acid 78.8% hydrogen peroxide 6.0% | compar. example surface opaque |
| 4. hydrofluoric acid, hydrogen peroxide/batch 10 min. room temp. | $1.4 \times 10^{12}$ | $<1.0 \times 10^{10}$ | hydrofluoric acid 0.5% hydrogen peroxide 10.0% | compar. example surface execessively etched, opaque |
| 5. electrolyzed anodic water (pH 2)/batch 10 min. room temp. | $1.5 \times 10^{12}$ | $1.1 \times 10^{10}$ | hydrochloric acid 0.04% (400 ppm) | compar. example |
| 6. high-purity water · ultrasonic (1 MHz) treated wtaer overflow 10 min. room temp. | $1.6 \times 10^{12}$ | $5.8 \times 10^{11}$ | — | compar. example |
| 7. electrolyzed anodic water pH 2 ultrasonic (1 MHz) treated water 10 min. room temp. | $1.4 \times 10^{12}$ | $<1.0 \times 10^{10}$ | hydrochloric acid 0.04% (400 ppm) | compar. example |
| 8. high-purity water + surfactant (200 ppm) overflow 10 min. room temp. | $1.5 \times 10^{12}$ | $1.0 \times 10^{12}$ | — | compar. example |
| 9. electrolyzed anodic water (pH 2) + surfactant (200 ppm)/ | $1.5 \times 10^{12}$ | $<1.2 \times 10^{10}$ | hydrochloric acid 0.04% (400 ppm) | example |

TABLE 3-continued

| wet treatment method | surface Cu concentration atoms/cm2 before | after | solubles in solution (disregarding removed Cu) | remarks |
|---|---|---|---|---|
| batch 10 min. room temp. | | | | |
| 10. electrolyzed anodic water (pH 2) + surfactant (200 ppm), ultrasonic (1 MHz)/ batch 10 min. room temp. | $1.8 \times 10^{12}$ | $<1.0 \times 10^{10}$ | hydrochloric acid 0.04% (400 ppm) | example |
| 11. electrolyzed anodic water (pH 2) + ultrasonic (1 MHz) treated batch 10 min. room temp. | $1.6 \times 10^{12}$ | $1.5 \times 10^{10}$ | hydrochloric acid 0.04% (400 ppm) | compar. example |
| 12. electrolyzed anodic water (pH 2) + surfactant (200 ppm), ultrasonic (1 MHz)/batch 5 min. room temp. | $1.7 \times 10^{12}$ | $<1.0 \times 10^{10}$ | hydrochloric acid 0.04% (400 ppm) | example | surfactant: anionic surfactant

As seen from Table 3, while deionized water containing a surfactant did not show any significant effect, a combination of a surfactant and electrolyzed anodic water remarkably removed metals.

While the operations of cleansing with hydrochloric acid/ aqueous hydrogen peroxide, sulfuric acid/aqueous hydrogen peroxide or hydrofluoric acid/aqueous hydrogen peroxide could effectively remove metals, they were accompanied by the drawbacks listed in the remarks column and hence are not feasible for the process of manufacturing liquid crystal displays. Additionally, they are costly and pose the problem of waste solution treatment.(Example 2)The effect of removing fine particles was tested with the method of the invention in different modes as in the case of Example 1. Glass substrates carrying an i-type a-Si film were used as objects of treatment, which had been contaminated with $SiO_2$ particles by means of the process of Table 4. For the purpose of comparison, a conventional silicon wafer cleansing process was also used. Table 5 shows the results in summarized form.

[Table 4]

1) i-type a-Si coated glass substrate
2) immersion in high-purity water (add with 10,000/ml of 1 μum silica particles) for 10 minutes
3) overflow rinsing with high-purity water for 5 minutes
4) spin drying

TABLE 5

| wet treatment method | number of particles on the surface/100 cm² before | after | solubles in solution (disregarding removed particles) |
|---|---|---|---|
| 1. high-purity water/ overflow 10 min. room temp. | 7860 | 7210 | — |
| 2. ammonia hydrogen peroxide 10 min. 65° C. | 7990 | 8150 | ammonia 4.1% hydrogen peroxide 4.3% |
| 3. electrolyzed water (pH 8)/ batch 10 min. | 7680 | 80 | ammonia 0.000002% (0.02 ppm) |
| 4. high-purity water · ultrasonic (1 MHz) treated water overflow 10 min. room temp. | 7710 | 310 | — |
| 5. electrolyzed cathodic water (pH 8) ultrasonic (1 MHz) treated water batch 10 min. room temp. | 7810 | 10 | ammonia 0.000002% (0.02 ppm) |
| 6. electrolyzed cathodic water (pH 8/batch → high-purity water · ultrasonic (1 MHz) | 7900 3500 | 3500 301 | ammonia 0.000002% |
| 7. electrolyzed cathodic water (pH 6.8) ultrasonic (1 MHz) treated water batch 10 min. room temp. | 7880 | 105 | no electrolyte added |
| 8. ammonia hydrogen peroxide · ultrasonic (1 MHz) | 7850 | 350 | ammonia 4.1% hydrogen peroxide 4.3% |

TABLE 5-continued

| wet treatment method | number of particles on the surface/100 cm² | | solubles in solution (disregarding removed particles) |
|---|---|---|---|
| | before | after | |
| treated water batch 10 min. 65° C. | | | |
| 9. high-purity watter + surfactant (200 ppm) overflow 10 min. | 7950 | 4210 | |
| 10. electrolized cathodic water (pH 8) + surfactant (200 ppm)/ overflow 10 min. room temp. | 7990 | 2990 | ammonia 0.00002 (0.02 ppm) |
| 11. electrolyzed anodic water (pH 2) + surfactant (200 ppm), ultrasonic (1 MHz/ batch 10 min. room temp. | 7810 | 95 | hydrochloric acid 0.04% (400 ppm) |
| 12. electrolyzed cathodic water (pH 8) + surfactant (200 ppm), ultrasonic (1 MHz)/ batch 10 min. room temp. | 7940 | 2 | ammonia 0.000002% (0.02 ppm) | surfactant: anionic surfactant

As seen from Table 5, electrolytically ionized water containing a surfactant proved to be highly effective for removing fine particles unlike high-purity water alone, or electrolytically ionized water alone or high-purity water containing a surfactant.

It was also found that the effect of electrolytically ionized water containing a surfactant is enhanced when it is irradiated with an ultrasonic wave.

The use of cathodic water is particularly effective.

(EXAMPLE 3)

The effect of removing fine particles was tested as in Example 2 except that alumina ($Al_2O_3$) was used as contaminant. Tables 6 and 7 respectively shows the contamination process and the summarized result.

[Table 6]
1) glass substrate
2) immersion in high-purity water (added with 20,000/ml of 1 μm alumina) for 10 minutes
3) overflow rinsing with high-purity water for 5 minutes
4) spin drying

TABLE 7

| wet treatment method | number of particles on the surface/100 cm² | | solubles in solution (disregarding removed particles) |
|---|---|---|---|
| | before | after | |
| 1. high-purity water/ overflow 10 min. room temp. | 2440 | 1880 | — |
| 2. ammonia hydrogen peroxide/batch 10 min. 65° C. | 3670 | 3730 | ammonia 4.1% hydrogen peroxide 4.3% |
| 3. electrolyzed | 2300 | 1920 | ammonia 0.000002% |

TABLE 7-continued

| wet treatment method | number of particles on the surface/100 cm² | | solubles in solution (disregarding removed particles) |
|---|---|---|---|
| | before | after | |
| cathodic water (pH 8)/batch 10 min. | | | (0.02 ppm) |
| 4. high-purity water · ultrasonic (1 MHz) treated water overflow 10 min. room temp. | 2670 | 1050 | — |
| 5. electrolyzed cathodic water (pH 8) ultrasonic (1 MHz) treated water batch 10 min. room temp. | 4460 | 100 | ammonia 0.000002% (0.02 ppm) |
| 6. electrolyzed cathodic water (pH 8)/batch → high-purity water · ultrasonic (1 MHz) | 3080 1523 | 1523 1100 | ammonia 0.000002% |
| 7. electrolyzed cathodic water (pH 6.8) ultrasonic (1 MHz) treated water batch 10 min. room temp. | 3010 | 550 | no added |
| 8. ammonia hydrogen peroxide · ultrasonic (1 MHz) treated water batch 10 min. 65° C. | 2870 | 870 | ammonia 4.1% hydrogen peroxide 4.3% |
| 9. high-purity water + surfactant (200 ppm) overflow 10 min. | 3090 | 2600 | |
| 10. electrolized cathodic water (pH 8) + surfactant (200 ppm)/ overflow 10 min. room temp. | 3550 | 1890 | ammonia 0.000002% (0.02 ppm) |
| 11. electrolyzed anodic water (pH 2) + surfactant (200 ppm), ultrasonic (1 MHz)/ batch 10 min. room temp. | 4590 | 630 | hydrochloric acid 0.04% (400 ppm) |
| 12. electrolyzed cathodic water (pH 8 ) + surfactant (200 ppm), ultrasonic (1 MHz)/ batch 10 min. room temp. | 4350 | 10 | ammonia 0.000002% (0.02 ppm) | surfactant: anionic surfactant

As seen from Table 7, and similarly to the case of $SiO_2$, electrolytically ionized water containing a surfactant proved to be highly effective for removing fine particles of $Al_2O_3$ unlike high-purity water alone, electrolytically ionized water alone or high-purity water containing a surfactant.

It was also found that the effect of electrolytically ionized water containing a surfactant is enhanced when it is irradiated with an ultrasonic wave.

The use of cathodic water is particularly effective.

(EXAMPLE 4)

The process of contamination, the contaminant, and the wet treatment method of Example 2 were followed in this example but different frequencies of ultrasonic wave were used to find the relationship between the frequency and the treatment effect.

TABLE 8

| | before treatment | | after treatment | |
|---|---|---|---|---|
| frequency | 0.5–5 (μm) | over 5 (μm) | 0.5–5 (μm) | over 5 (μm) |
| 3 MHz | 6210 | 620 | 5 | 0 |
| 1 MHz | 6290 | 680 | 5 | 0 |
| 750 MHz | 6280 | 690 | 30 | 0 |
| 200 MHz | 6290 | 670 | 100 | 0 |
| 32 MHz | 6220 | 670 | 110 | 0 |
| 25 MHz | 6180 | 690 | 2910 | 5 |
| 3 MHz → 32 kHz | 6220 | 680 | 5 | 0 |
| 32 kHz → 3 MHz | 6250 | 610 | 5 | 0 | unit: particles/100 cm²

As seen from Table 8, the use of a frequency less than 30 kHz could not satisfactorily remove fine particles, i.e. particle with a diameter less than 5 μm. Therefore, the use of an ultrasonic wave with a frequency greater than 30 kHz is required to obtain a satisfactory result. Note that the effect of removing particles with a diameter less than 5 μm rose remarkably when the frequency exceeded 1 MHz.

Particles with relatively large diameters and relatively small diameters can be removed effectively by cleansing, gradually shifting the frequency from 3 MHz to 32 kHz (from a high frequency to a low frequency) or vice versa. Somehow, the shift of frequency from a low frequency to a high frequency is more effective than the other way round. (Example 5) Glass substrates and substrates for evaluating the residual surfactant were contaminated with $SiO_2$ particles having a diameter of 1 μm as in the case of Example 2. Thereafter, they were treated with electrolyzed cathodic water (pH8) containing surfactant (200 ppm) in the wet treatment system of FIG. 1, while irradiating the water with an ultrasonic wave (1 MHz).

The substrates for evaluating the residual surfactant were taken out and the residual surfactant on the surface of the specimens was observed by FTIR to find out that it was adhering to the surface at a rate of $1.2 \times 10^{15}$ molecules/cm² in terms of $CH_2$ radical.

Then, the addition of the surfactant was suspended and the ozone generator was operated to treat the remaining substrates for determining the residual surfactant with electrolytically ionized water containing ozone to a concentration of 9 ppm for 5 minutes.

The surface of each of the substrates for determining the residual surfactant was observed as in the preceding examples to find that the concentration was below the detection limit of the analyzing apparatus ($3 \times 10^{13}$ molecules/cm²) and therefore it was confirmed that the surfactant had been completely removed. It was also found that the $SiO_2$ particles on the glass substrates had been removed.

Additionally, after forming gate electrodes (Cr), a gate insulation film (silicon nitride), and i⁻type a-Si, n⁺type a-Si and Al/Cr electrodes were formed on a glass substrate in the process of manufacturing substrates for liquid crystal displays and they were subjected to a device separating operation. Thereafter, they were cleansed with electrolytically ionized water and treated with aqueous ozone and an Al film was formed thereon. Then, a pattern was formed thereon with a width of 3 μm. The effect of ozone on the Al wires on the silicon nitride film and the patterning precision was examined particularly in terms of the existence of peeled film.

A total of 100 spots were examined and no peeled film was found. The pattern showed a width of 2.9 μm±0.1 μm when treated with aqueous ozone and a width of 2.8 μm±0.3 μm when not treated with aqueous ozone to prove that the deviation in the width was reduced by an aqueous ozone treatment. It may be assume that this improvement was realized by an enhanced adhesion of the film.

What is claimed is:

1. A wet treatment method comprising:
   electrolyzing deionized water or high purity water to produce anodic or cathodic water.
   adding a surfactant at a concentration between 1 and 500 ppm to the anodic or cathodic waters,
   and treating an object of treatment with the anodic or cathodic water containing the surfactant while irradiating the object of treatment with an ultrasonic wave having a frequency between 30 kHz and 3 MHz.

2. A wet treatment method according to claim 1, wherein the surfactant is an anionic, cationic or nonionic surfactant.

3. A wet treatment method according to claim 1, wherein the object of treatment is immersed in the anodic or cathodic water stored in or flowing through a container, while irradiating it with the ultrasonic wave.

4. A wet treatment method according to claim 1, wherein the anodic or cathodic water is continuously jetted or dropped onto the object of treatment from a nozzle, while irradiating at least a part of a feed pipe with the ultrasonic wave, the feed pipe carrying the anodic or cathodic water, and the part being located upstream of the nozzle.

5. A wet treatment method according to claim 1, wherein the object of treatment is treated with aqueous ozone after being treated with the anodic or cathodic water containing the surfactant.

6. A wet treatment method according to claim 5, wherein the aqueous ozone is deionized water, high-purity water or cathodic or anodic water containing ozone at a concentration between 0.5 and 15 ppm.

7. A wet treatment method according to claim 5, wherein the object of treatment is treated with electrolytically ionized water containing the surfactant prepared by adding the surfactant to the anodic or cathodic water obtained by electrolyzing the deionized water or high-purity water and the object is subsequently treated in a treatment zone with anodic water containing ozone prepared by suspending the addition of the surfactant and electrolyzing the deionized water or high-purity water under a condition apt to generate ozone.

8. A wet treatment method according to claim 1, wherein the deionized water or high-purity water to be electrolyzed is prepared by means of a deionized water producing apparatus or a high-purity water producing apparatus provided at least with an ion exchange system, a membrane separation system or an evaporation system, to which an electrolyte is optionally added.

9. A wet treatment method according to claim 1, wherein the step of electrolyzing the deionized water or high-purity water takes place in an apparatus that comprises three chambers: an anode chamber provided with an anode, a cathode chamber provided with a cathode and an intermediary chamber formed between the anode chamber and the cathode chamber by arranging a pair of diaphragms so that feed water is fed into each of the three chambers and treated water is discharged out from each of the three chambers.

10. A wet treatment method according to claim 9, wherein the diaphragms are ion exchange membranes.

11. A wet treatment method according to claim 9, wherein the intermediary chamber is filled with a solid electrolyte.

12. A wet treatment according to claim 1, wherein the object of treatment is a substrate of a liquid crystal display.

13. The wet treatment method of claim 1, wherein the frequency of the ultrasonic wave is varied from 30 kHz to 3 MHz.

14. The wet treatment method of claim 1, wherein the frequency of the ultrasonic wave is varied from 3 MHz to 30 kHz.

15. A wet treatment method comprising:

electrolyzing deionized water or high purity water to produce anodic or cathodic water, adding a surfactant to the anodic or cathodic water, and treating an object of treatment with the anodic or cathodic water containing the surfactant while irradiating the object of treatment with an ultrasonic wave that is varied from a first frequency to a second frequency.

16. The wet treatment method of claim 15, wherein the first frequency is 30 kHz and the second frequency is 3 MHz.

17. The wet treatment method of claim 15, wherein the first frequency is 3 MHz and the second frequency is 30 kHz.

* * * * *